United States Patent [19]

Benner et al.

[11] Patent Number: 5,698,295

[45] Date of Patent: Dec. 16, 1997

[54] REPULPABLE, MOISTURE RESISTANT CORRUGATED BOARD

[75] Inventors: Thomas L. Benner, Mattawan; John L. Childress, Kentwood; James R. Simpson, Grand Rapids, all of Mich.

[73] Assignee: Dallas Enviro-Tek International, Inc., Dallas, Tex.

[21] Appl. No.: 473,725

[22] Filed: Jun. 7, 1995

[51] Int. Cl.⁶ .................................................. B32B 3/28
[52] U.S. Cl. ...................... 428/182; 428/507; 428/913
[58] Field of Search ................................. 428/182, 485, 428/507, 532, 913

[56] References Cited

U.S. PATENT DOCUMENTS

| | | | |
|---|---|---|---|
| 2,548,802 | 4/1951 | Linscott | 260/85.1 |
| 3,033,708 | 5/1962 | McKee | 428/182 |
| 3,085,026 | 4/1963 | Weisgerber | 428/182 |
| 3,308,006 | 3/1967 | Kresse et al. | |
| 3,523,058 | 8/1970 | Shick | 161/133 |
| 3,791,856 | 2/1974 | Duling | 117/155 VA |
| 4,117,199 | 9/1978 | Gotoh et al. | 428/486 |
| 4,129,542 | 12/1978 | Matheson et al. | 260/28.5 |
| 4,315,830 | 2/1982 | French et al. | 252/182 |
| 4,556,603 | 12/1985 | Thorsrud | 428/283 |
| 4,569,968 | 2/1986 | Uffner et al. | 525/54.5 |
| 4,576,987 | 3/1986 | Cockatt et al. | |
| 4,681,910 | 7/1987 | Crockatt et al. | 524/487 |
| 5,126,390 | 6/1992 | Duff | 524/276 |
| 5,232,987 | 8/1993 | Sakakibara et al. | 525/98 |
| 5,258,087 | 11/1993 | Symons | 428/182 |
| 5,308,896 | 5/1994 | Hansen et al. | 524/13 |
| 5,336,712 | 8/1994 | Austgen, Jr. et al. | 524/530 |
| 5,362,573 | 11/1994 | Pandian et al. | 428/511 |
| 5,447,977 | 9/1995 | Hansen et al. | 524/13 |

OTHER PUBLICATIONS

PCT Notification of Transmittal of The International Search Report or the Declaration (PCT/US96/07180).

*Primary Examiner*—Donald Loney
*Attorney, Agent, or Firm*—Baker & Botts, L.L.P.

[57] ABSTRACT

A repulpable sheet of moisture resistant corrugated board (10) having inner and outer linerboard sheets (12, 14, respectively) with a convoluted or corrugated sheet of corrugating medium (16) therebetween, the flutes (16a) of the medium being joined to the linerboard sheets by an adhesive. The inner and outer linerboard sheets are coated before being joined to the medium with moisture resistant coatings (20, 22, respectively), which do not detract from the repulpability of the corrugated board, and the corrugating medium is coated with a moisture resistant coating, which does not detract from the repulpability of the corrugated board, before being joined to the inner and outer linerboard sheets. Because of the character of the coatings applied to the inner and outer linerboard sheets and to the corrugating medium, the adhesive used to join the corrugating medium to the inner and outer linerboard sheets is a cold set adhesive.

6 Claims, 1 Drawing Sheet

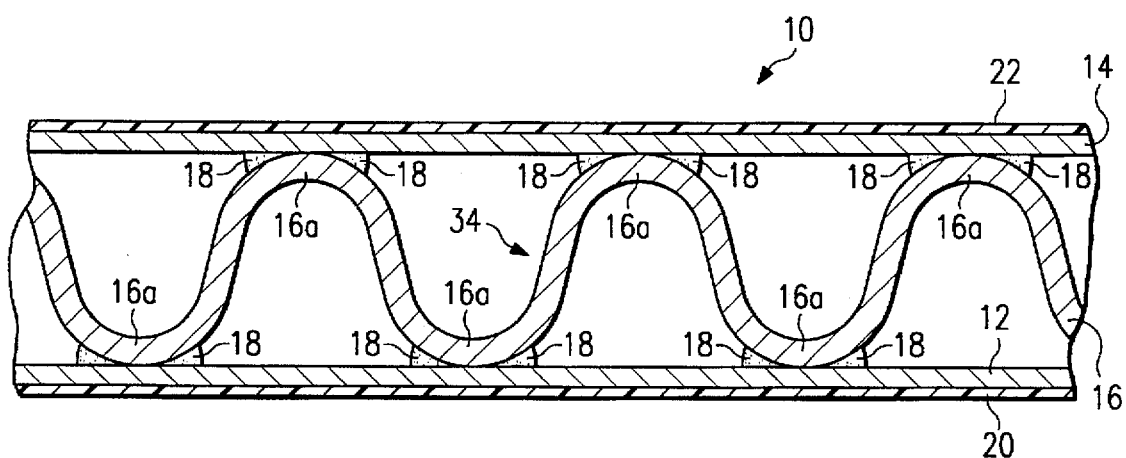

REPULPABLE, MOISTURE RESISTANT CORRUGATED BOARD

FIELD OF THE INVENTION

This invention relates to a moisture resistant corrugated board. More particularly, this invention relates to a moisture resistant corrugated board that can be repulped after its disposal.

Background of the Invention

Corrugated fiberboard containers are used in many high humidity bulk packaging applications, such as in the packaging of fresh produce items. To overcome the known impairment in the strength of corrugated fiberboard in high humidity service, it is customary to treat such containers, or the corrugated fiberboard sheets or blanks from which the containers are formed, by impregnating them with a wax or wax-based material. Unfortunately, wax treated containers cannot be repulped, and this requires that such containers be disposed of after use in an environmentally objectionable way, such as by incineration or disposition in a landfill. Such a method of disposition is also economically disadvantageous, since used corrugated containers that are suitable for repulping have a significant resale value.

BRIEF SUMMARY OF THE INVENTION

According to the present invention there is provided a repulpable corrugated fiberboard with satisfactory moisture resistance for use in high humidity packaging applications, such as in the packaging of fresh produce items. The corrugated fiberboard of the present invention utilizes a cold set adhesive, rather than a conventional starch adhesive, to bond the inner and outer liners of the corrugated sheet to the tips of a corrugated medium that is positioned therebetween. A cold set adhesive manufactured by Sonoco Products Company of Hartsville, S.C. under the product designation CD 46-33 has been found to be suitable for use in joining the layers of corrugated board to one another when the layers have been treated with moisture resistant coatings as hereinafter described.

The liners of the corrugated fiberboard are coated, as by rod coating prior to processing on a corrugator, with an FDA approved waterproofing agent, such as a clear coating for the inner surface of the inner liner sold by Progressive, Inc. of Shreveport, La. under the designation V-323 Inner Clear Coat, and a white coating for the outer surface of the outer liner, such as a white coating sold by Progressive, Inc. of Shreveport, La. the designation W-108 White Coating. Further, the corrugating medium used in such corrugated fiberboard is coated, as by rod coating prior to processing on a corrugator, with an FDA approved waterproofing agent, such as the Medium Coating V-318 or V-319 sold by Progressive, Inc. of Shreveport, La.

While the application of the coating materials described above is preferably by rod coating prior to the joining of such materials to one another in a corrugating operation, it is also contemplated that the coating can be performed as part of a corrugating operation, on the corrugator itself, where it would otherwise would be advantageous to do so.

A corrugated board produced in accordance with the present invention can be readily scored and otherwise fabricated to permit it to be formed into containers and other useful products. In that regard, it inherently solves a problem that was previously solved at substantial complexity and expense by the construction of U.S. Pat. No. 3,523,058 (Shick), the disclosure of which is hereby incorporated by reference.

Accordingly, it is an object of the present invention to provide an improved moisture resistant corrugated board. More particularly, it is an object of the present invention to provide a corrugated board that can be repulped after its disposal.

For a further understanding of the present invention and the objects thereof, attention is directed to the drawing and the following brief description thereof, to the detailed description of the preferred embodiment, and to the appended claims.

BRIEF DESCRIPTION OF THE DRAWING

The sole FIGURE of the drawing is a fragmentary view, in cross section, of a sheet of corrugated board according to the preferred embodiment of the present invention.

DETAILED DESCRIPTION OF THE PREFERRED EMBODIMENT

A section of a sheet of corrugated board is indicated generally by reference numeral 10 in the drawing, and the corrugated board is made up of an inner, product containing sheet of linerboard 12, an outer sheet of linerboard 14, and a convoluted or corrugated sheet of corrugating medium 16 that is between and adhesively joined to the sheets of linerboard 12, 14 at the tips or flutes 16a of the corrugated medium by an adhesive 18, whose composition will be hereinafter described in more detail.

The inner sheet of linerboard 12 is coated on its inner, product contacting surface with a layer 20 of a coating composition that imparts moisture resistance to the linerboard 12, and the corrugated board 10 incorporating the linerboard 12. Likewise, the outer sheet of linerboard 14 is coated with a layer 22 of a composition that imparts moisture resistance to the linerboard 14, and to the corrugated board 10 that incorporates the linerboard 14. The coatings 20, 22 may be applied to the linerboard sheets 12, 14 prior to the delivery to a commercial corrugator of the rolls from which such linerboard sheets 12, 14 are taken, for example, by rod coating, or the coatings 20, 22 may be applied to the linerboard sheets 12, 14 on a corrugator as part of the corrugating operation, but prior to the bonding of the corrugating medium 16 thereto, if so desired. Further, the corrugated medium 16 is also provided with a coating of a moisture resistant composition, not specifically shown, either prior to the delivery to the corrugator of the roll from which such corrugated medium 16 is formed, or on the corrugator as part of the corrugating operation, but prior to the bonding of the corrugating medium 16 to the linerboard sheets 12, 14.

The moisture resistant coating layer 20 must be approved by the Food and Drug Administration for use in food contact surfaces, if the corrugated board 10 is to be used in a food packaging operation, and the coating layer 20 preferably must not inhibit the repulping of the corrugated board 10 to avoid the need to dispose of the corrugated board 10, after its useful life is completed, by incineration or disposition in a landfill.

While the coating layer 22, in the outer linerboard sheet 14 is not expected to be in direct contact with contents packaged in a container formed from the corrugated board 10, and, thus, need not necessarily be subject to Food and Drug Administration approval, nevertheless there are Food and Drug Administration requirements for indirect components of a food container, and it is important that the coating layer 22 meet such requirements. Further, the coating layer 22 must not impede the repulping of the corrugated board 10, when the coating layer 22 is specifically selected to permit the corrugated board 10 to be repulped, and the coating layer 22 preferably must have a white color, to permit appropriate graphics to be imparted thereto. It is also desirable that the coating layer 22 not inhibit printing of the outer linerboard sheet after the completion of the corrugating operation.

A coating which has been found to be suitable for use as the coating 20 in the corrugated board 10 is a clear, water-based, tri-polymer blend coating of the type sold by Progressive, Inc. of Shreveport, La. under the designation V-323 Inner Clear Coat, and is preferably applied in a 36-40% solids concentration at the approximate coating weight of 3 pounds per MSF (thousand square feet), when applied to a 69 pound kraft liner by a smooth rod in a rod coating operation. A cellulosic material, such linerboard or a corrugated board formed therefrom, with such a coating has good grease and oil resistance, as well as good water vapor transmission resistance, it has good flexibility at scores, thus permitting fabrication of containers from the corrugated board, and it exhibits good heat resistance when applied before corrugation. The product can also be made heatsealable, and the corrugated board to which it is applied is fully repulpable.

The coating 22 that is applied to the outer linerboard 14 is preferably a white, water-based, tri-polymer blend coating of the type sold by Progressive, Inc. of Shreveport, La. under the designation W-108 White Coating. Such a coating, which is preferably applied in a 60-66% solids concentration at the approximate rate of 4 pounds per MSF to 69 pound linerboard, is glueable and printable after application, and has very good weatherability for applications requiring outdoor storage. It has very good chemical, oil and grease resistance, and it does not crack when scored, which enhances its moisture vapor transmission resistance properties. Further, the corrugated board 10 is fully repulpable when such a coating composition is used for the coating layer 22. Because of the post-printability and the white coloration of the coating 22, a container fabricated from the corrugated board 10 can be readily printed on, in a single or in multiple colors, to meet the graphics needs or desires of customers.

When using 69 pound linerboard sheets for the linerboard layers 12, 14, the corrugated medium is preferably of 33 pound weight. In any case, moisture resistance is also imparted to the corrugating medium 16 by coating it, either by rod coating prior to the delivery to the corrugator of a roll from which such corrugated medium 16 is to be formed or on the corrugator as part of the corrugating operation, with a moisture resistant coating such as the Medium Coating V-318 or V-319 sold by Progressive, Inc. of Shreveport, La., preferably in a 50-60% solids concentration in the approximate amount of 3 pounds per MSF. Corrugated medium materials and the corrugated board formed therefrom coated with such coatings have good water and heat resistance, they meet FDA requirements for indirect materials for use in food containers, they are glueable and they are repulpable.

When the layers 12, 14, 16 are treated with moisture resistant coatings, as heretofore described, they cannot be readily bonded or adhered to one another by the use of conventional starch adhesives of the type widely used in manufacturing conventional corrugated board. However, it is found that such layers can be readily joined to one another by the use of a cold set adhesive. A cold set adhesive found to be suitable for use in joining moisture treated corrugated medium to moisture resistant liners, as heretofore described, is a liquid adhesive of the type sold by Sonoco Products Company of Hartsville, S.C. under the designation CD 46-33. Such an adhesive is a white, water borne, resin based adhesive and it is specifically designed for laminating on a corrugator. This adhesive has good roll coating properties, and sets up quickly with minimum heat. A dried glue line with such an adhesive is somewhat flexible, and is advertised as meeting F.D.A. regulation CFR 29, paragraph 175.105. Such an adhesive has an advertised total solids composition of approximately 43.0%, a pH of 5.2, with good mechanical stability and fair water resistance.

EXAMPLE 1

Various samples of 69 pound linerboard, including untreated control samples, samples treated with Progressive V-323 Clear Coating and samples treated with Progressive W-108 White Coating, were tested for various properties, with the following results:

| Sample | Control Uncoated | Clear V-323 Coated | White Coated |
| --- | --- | --- | --- |
| CD Ring Crush (lbs/6 inches) | | | |
| RC-Average | 169.7 | 170.8 | 169.7 |
| RC-Sigma | 10.7 | 3.1 | 9.7 |
| RC-Range | 37.9 | 9.1 | 32.7 |
| Basis Weight (Actual lbs./MSF) | | | |
| Weight | 70.0 | 69.0 | 71.7 |
| Gurley Porosity (Seconds/100 cc) | | | |
| Average | 31.2 | 148.7 | >1000 |
| Sigma | 1.0 | 9.7 | |
| Range | 2.3 | 22.9 | |
| Thirty Minute COBB (grams/100 cm$^2$) | | | |
| Average | 126 | 59 | 32 |

The very substantial increase in the Gurley Porosity test results for the coated samples relative to the uncoated control samples, and the very substantial reduction in the Thirty Minute COBB test results for the coated samples relative to the uncoated control samples, are indicative of a very substantial improvement in the moisture resistance (moisture vapor transmission resistance or "MVTR") of the coated samples.

EXAMPLE 2

A corrugated board was produced on a commercial corrugator at rates of 250 ft./minute and 280 ft./minute from a single facer 69 pound kraft linerboard sheet precoated with Progressive V-323 clear coating, a double facer 69 pound kraft linerboard sheet precoated with Progressive W-108 white coating and a 33 pound corrugated medium sheet precoated with Progressive V-318 clear coating. The sheets were adhered together with a diluted Sonoco cold set adhesive 9E 117-18, after purging the starch adhesive previously used from the system. The corrugated board produced at 250 ft./minute had very good fibre pull adhesion, and it was observed as being better formed than conventional corrugated board with better adhesion than conventional, starch adhered corrugated board. At a production speed of 280 ft./minute, the board showed signs of adhesive bond failure, due to the poor flow characteristics of the cold set adhesive at higher flow rates.

Although the best mode contemplated by the inventor(s) for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed:

1. A moisture-resistant repulpable corrugated board useful in fabricating containers comprising:

an inner, product contacting liner;

an outer liner;

a corrugated medium; and an adhesive joining a first set of flutes of the corrugated medium to the inner liner and a second set of flutes of the corrugated medium to the outer liner;

wherein said inner liner is coated with a first coating that imparts moisture resistance thereto without detracting from the repulpability of the corrugated board;

wherein said outer liner is coated with a second coating that imparts moisture resistance thereto without detracting from the repulpability of the corrugated board;

wherein said corrugated medium is coated with a third coating that imparts moisture resistance thereto without detracting from the repulpability of the corrugated board; and wherein said adhesive is an adhesive of the cold set type.

2. A corrugated board according to claim 1 wherein:

said first coating is a clear coating;

said second coating is a white coating; and said third coating is a clear coating.

3. A corrugated board according to claim 2 wherein:

said first coating is applied to said inner liner before said corrugated medium is joined thereto;

said second coating is applied to said outer liner before said corrugated medium is joined thereto; and said third coating is applied to said corrugated medium before said inner liner and said outer liner are joined thereto.

4. A corrugated board according to claim 3 wherein;

said first coating is suitable for direct contact with food; and said second coating and said third coating are suitable for indirect contact with food in containers for the packaging of food.

5. A corrugated board according to claim 1 wherein said first coating is applied to a surface of said inner liner that is away from said corrugated medium, and wherein said second coating is applied to a surface of said outer liner that is away from said corrugated medium.

6. A corrugated board according to claim 2 wherein said second coating is capable of being printed on after application to said outer liner.

* * * * *